US010931423B2

(12) United States Patent
Martin et al.

(10) Patent No.: US 10,931,423 B2
(45) Date of Patent: *Feb. 23, 2021

(54) TELECOMMUNICATIONS APPARATUS AND METHODS

(71) Applicants: Sony Corporation, Tokyo (JP); Sony Mobile Communications Inc., Tokyo (JP)

(72) Inventors: Brian Alexander Martin, Basingstoke (GB); Anders Berggren, Lund (SE); Martin Warwick Beale, Basingstoke (GB)

(73) Assignees: SONY CORPORATION, Tokyo (JP); SONY MOBILE COMMUNICATIONS INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/844,467

(22) Filed: Apr. 9, 2020

(65) Prior Publication Data

US 2020/0235890 A1 Jul. 23, 2020

Related U.S. Application Data

(63) Continuation of application No. 16/079,115, filed as application No. PCT/EP2017/053752 on Feb. 20, 2017, now Pat. No. 10,623,164.

(30) Foreign Application Priority Data

Mar. 23, 2016 (EP) ..................................... 16162035

(51) Int. Cl.
H04W 48/10 (2009.01)
H04L 5/00 (2006.01)
(Continued)

(52) U.S. Cl.
CPC .......... H04L 5/0053 (2013.01); H04L 5/0032 (2013.01); H04W 4/70 (2018.02);
(Continued)

(58) Field of Classification Search
None
See application file for complete search history.

(56) References Cited

U.S. PATENT DOCUMENTS

2013/0260740 A1 10/2013 Rayavarapu
2016/0278160 A1 9/2016 Schliwa-Bertling et al.
(Continued)

OTHER PUBLICATIONS

Ericsson, "Support of UE mobility for Solution 18—User Plane CIOT Optimisations," R3-160121 (was R3-160094), 3GPP TSG RAN WG3 AdHoc NB-IoT Budapest, Hungary, Jan. 20-22, 2016, pp. 1-12.
Ericsson, Verizon Wireless, AT&T, "On RRC Resume ID," Tdoc RP-160330, 3GPP TSG-RAN Meeting #71, Gothenburg, Mar. 7-10, 2016, pp. 1-3.
(Continued)

Primary Examiner — Brandon M Renner
(74) Attorney, Agent, or Firm — Xsensus LLP

(57) ABSTRACT

A method of operating a terminal device in a wireless telecommunications network comprising the terminal device and a plurality of base stations arranged into groups of one or more base stations supporting communications over different areas. The method including establishing a radio resource control (RRC) connection with an initially selected base station and entering an RRC connected mode of operation with respect to the initially selected base station and suspending the RRC connection with the initially selected base station and entering an RRC suspended mode of operation. The method includes subsequently transmitting a message to request a resumed RRC connection to a subsequently selected base station, wherein the subsequently selected base station is selected in accordance with a cell (re)selection procedure for the terminal device performed while in the RRC suspended mode of operation.

19 Claims, 3 Drawing Sheets

(51) Int. Cl.
*H04W 76/19* (2018.01)
*H04W 76/27* (2018.01)
*H04W 4/70* (2018.01)
*H04W 72/04* (2009.01)
*H04W 48/20* (2009.01)

(52) U.S. Cl.
CPC ..... *H04W 72/048* (2013.01); *H04W 72/0413* (2013.01); *H04W 76/19* (2018.02); *H04W 76/27* (2018.02); *H04W 48/20* (2013.01)

(56) References Cited

U.S. PATENT DOCUMENTS

2018/0376346 A1* 12/2018 Givoni .................. H04W 12/06
2019/0021134 A1* 1/2019 Zhang ............... H04W 36/0033
2019/0045345 A1 2/2019 Lee et al.
2020/0014550 A1* 1/2020 Xu ........................ H04L 12/189

OTHER PUBLICATIONS

ETSI TS 122 368 V12.4.0, "Digital cellular telecommunications system (Phase 2+); Universal Mobile Telecommunications System (UMTS); LTE; Service requirements forMachine-Type Communications (MTC); Stage 1," (3GPP TS 22.368 version 12.4.0 Release 12), Oct. 2014, pp. 1-22.

Holma, H. and Toskala, A., "LTE for UMTS: OFDMA and SC-FDMA Based Radio Access," First published: Mar. 31, 2009, Copyright © 2009 John Wiley & Sons, Ltd,Print ISBN:9780470994016, pp. 1-8.

NTT DOCOMO Inc., "RRC Connection Resume at different eNB," R2-161653, 3GPP TSG-RAN WG2 #93, Feb. 15-19, 2016, St. Julian's, Malta, pp. 1-2.

ZTE, "Way forward on msg3," RP-160284, TSG RAN#71, Mar. 7-10, 2016, Goteborg, Sweden, pp. 1-3.

International Search Report and Written Opinion for International Application No. PCT/EP2017/053752 dated Apr. 20, 2017.

* cited by examiner

TELECOMMUNICATIONS APPARATUS AND METHODS

CROSS-REFERENCE TO RELATED APPLICATIONS

The present application is a continuation of U.S. application Ser. No. 16/079,115, filed Aug. 23, 2018, which is based on PCT filing PCT/EP2017/053752, filed Feb. 20, 2017, which claims priority to EP 16162035.6, filed Mar. 23, 2016, the entire contents of each are incorporated herein by reference.

BACKGROUND

Field

The present disclosure relates to telecommunications apparatus and methods.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architectures, are able to support more sophisticated services than simple voice and messaging services offered by previous generations of mobile telecommunication systems.

For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage areas for these networks is expected to increase rapidly.

The anticipated widespread deployment of third and fourth generation networks has led to the parallel development of devices and applications which, rather than taking advantage of the high data rates available, instead take advantage of the robust radio interface and increasing ubiquity of the coverage area. Examples include so-called machine type communication (MTC) applications, which are typified by semi-autonomous or autonomous wireless communication devices (i.e. MTC devices) communicating small amounts of data on a relatively infrequent basis. Further information on characteristics of MTC-type devices can be found, for example, in the corresponding standards, such as ETSI TS 122 368 V12.4.0 (2014 October)/3GPP TS 22.368 version 12.4.0 Release 12 [1]. Some typical characteristics of MTC type terminal devices/MTC type data might include, for example, characteristics such as low mobility, high delay tolerance, small data transmissions, a level of predictability for traffic usage and timing (i.e. traffic profile), relatively infrequent transmissions and group-based features, policing and addressing.

A current technical area of interest to those working in the field of wireless and mobile communications is known as "The Internet of Things" or IoT for short. The 3GPP has proposed to develop technologies for supporting narrow band (NB)-IoT using an LTE/4G wireless access interface and wireless infrastructure. Such IoT devices are expected to often be low complexity and inexpensive devices requiring infrequent communication of relatively low bandwidth data (e.g. MTC devices).

In view of this and the increasing use of wireless telecommunications systems more generally, it may be expected that in the future there may be very large numbers of devices, for example including low cost IoT/MTC devices, which need to be supported in wireless telecommunications systems. Accordingly, there is a need for approaches that can help efficiently support a large number of devices, for example in terms of managing signalling overhead, in wireless telecommunications systems.

SUMMARY

The present disclosure can help address or mitigate at least some of the issues discussed above.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
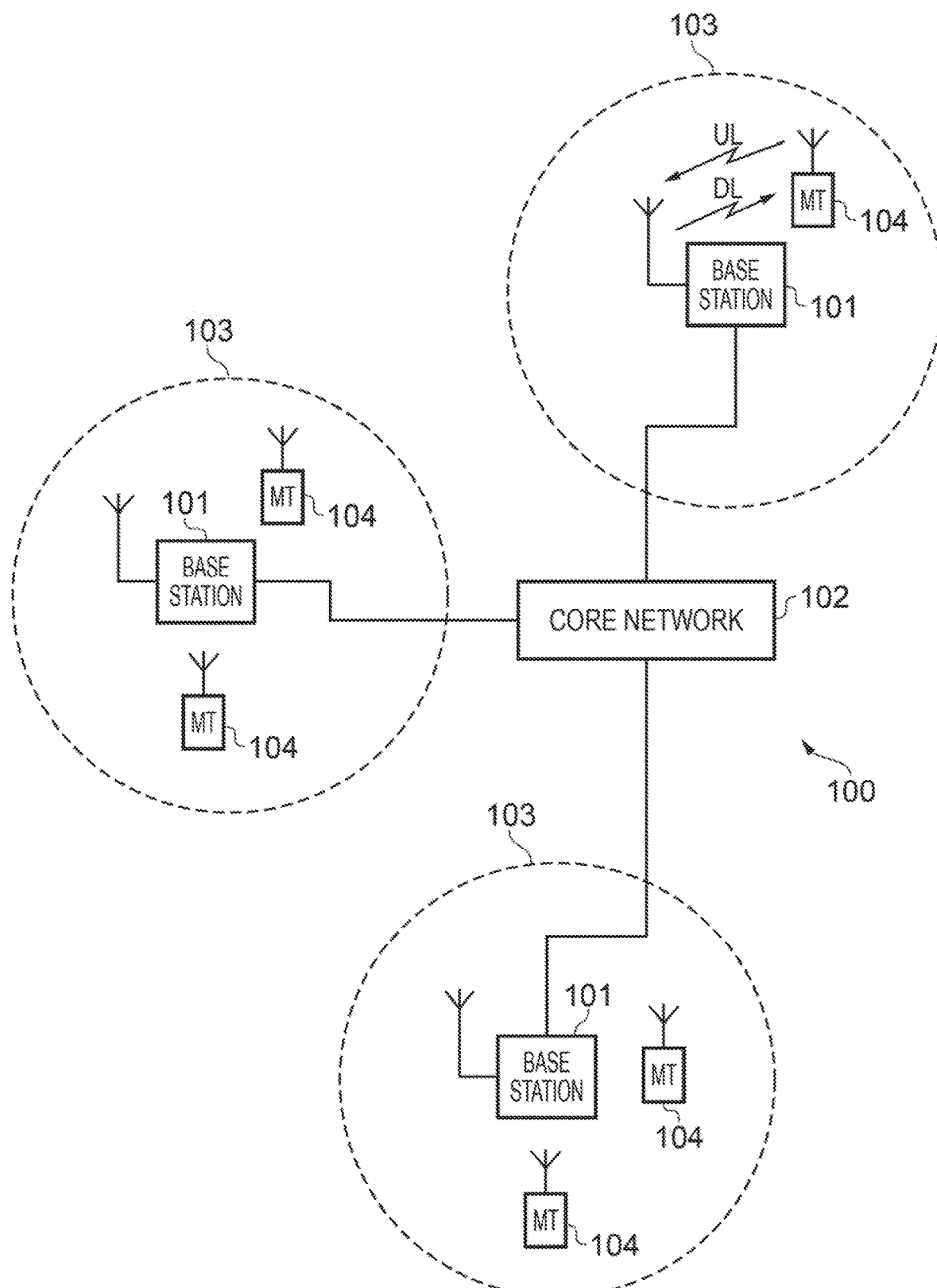
FIG. 1 schematically represents some aspects of a LTE-type wireless telecommunication network.

FIG. 1 provides a schematic diagram illustrating some basic functionality of a mobile telecommunications network/system 100 operating in accordance with LTE principles and which may be adapted to implement embodiments of the disclosure as described further below. Various elements of FIG. 1 and their respective modes of operation are well-known and defined in the relevant standards administered by the 3GPP (RTM) body, and also described in many books on the subject, for example, Holma H. and Toskala A [2]. It will be appreciated that operational aspects of the telecommunications network which are not specifically described below may be implemented in accordance with any known techniques, for example according to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, communications device, and so forth. Base stations, which are an example of network infrastructure equipment, may also be referred to as transceiver stations/nodeBs/e-nodeBs, and so forth.

As is well understood, in wireless telecommunications networks, such as an LTE type network, there are different Radio Resource Control (RRC) modes for terminal devices. For example, it is common to support an RRC idle mode (RRC_IDLE); and an RRC connected mode (RRC_CONNECTED).

Generally speaking, in RRC connected mode a terminal device is connected to a base station in the sense of being able to receive user plane data from the base station and in RRC idle mode the terminal device is not connected to a base station in the sense of not being able to receive user plane data from the base station. In idle mode the terminal device may still receive some communications from base stations, for example reference signalling for cell reselection purposes and other broadcast signalling. For the RRC idle mode, the core network (CN) part of the wireless telecommunications system recognizes the terminal device is present within the network, but the radio access network (RAN) part of the wireless telecommunications system (i.e. comprising the base stations) does not. Thus, in broad summary, in RRC idle mode the terminal device is not connected to a base station, whereas in RRC connected mode the terminal device is connected/attached to a base station. The RRC connection setup procedure of going from RRC idle mode to RRC connected mode may be referred to as connecting to a cell/base station.

One characteristic of the RRC connected mode is the allocation of a cell-specific temporary radio network identifier (C-RNTI) to the terminal device to allow the base station to which the terminal device is connected to address communications to the terminal device. A terminal device in a conventional RRC idle mode will not be associated with this kind of RNTI.

Another characteristic of the RRC connected mode is the association of one or more dedicated logical channels with the terminal device to allow the terminal device to exchange data with the base station to which it is connected. A terminal device in a conventional RRC idle mode will not be associated with this kind of dedicated logical communication channel.

Another characteristic of the RRC connected mode is that a terminal device in RRC connected mode will have established a security context by exchanging security settings with the base station to which it is attached as part of its RRC connection procedure. A terminal device in a conventional RRC idle mode will not, however, have this kind of established security context.

More generally, a base station to which a terminal device is connected in RRC connected mode will retain information relating to the terminal device, for example its allocated C-RNTI, logical channel configuration settings, security settings, and so on, to allow the base station to communicate with the terminal device. This information may generally be referred to as a terminal device context in/at the base station.

In accordance with conventional approaches, when a terminal device releases its RRC connection with respect to a particular base station and transitions to conventional RRC idle mode, the base station releases the terminal device context.

Whilst in RRC idle mode a terminal device will receive signalling from base stations covering its location (i.e. base stations within radio signalling range of its location), for example reference signalling and other broadcast signalling. Based on this signalling the terminal device is able to determine what is currently the most appropriate base station to connect to were the terminal device were required to establish a connection to the network, for example to transmit uplink data or in response to a paging request. This on ongoing procedure/process for determining the most appropriate base station to connect to is known as cell selection/reselection. The terminal device will synchronise to a selected base station and decode relevant broadcast information, for example information transmitted in master information block (MIB) and system information block (SIB) transmissions, from the selected base station so the terminal device is able to initiate a radio resource connection with the selected base station as and when appropriate.

When a terminal device operating in an RRC idle mode wishes to transition to an RRC connected mode to exchange data with the network, it transmits an RRC connection request message to the currently selected base station to initiate an RRC connection procedure in accordance with well-established techniques.

In association with the RRC connection procedure, signalling is exchanged between the terminal device and the base station to allow the base station to establish a context for the terminal device to support subsequent communications in the RRC connected mode, for example to exchange information relating to a C-RNTI for the terminal device, dedicated logical channel configuration settings, and security settings.

The use of RRC idle mode can be beneficial for a terminal device, for example in terms of power saving. However, a drawback of switching to RRC idle is the signalling overhead associated with establishing a new RRC connection when the terminal device is required to reconnect to a base station and exchange data with the base station to allow the base station to establish a context for the terminal device. This signalling overhead has an impact for the terminal device in terms of using power and also for the wireless telecommunications network as a whole in terms of taking up radio resources that might otherwise be used for other communications. Consequently, there is typically a compromise to be made between entering RRC idle mode frequently (to preserve terminal device power) and remaining in RRC connected mode for longer periods (to reduce re-connection signalling overhead).

In view of this issue, it has been recognised that certain wireless telecommunications systems may benefit from supporting a modified RRC idle mode in which the base station to which a terminal device was previously connected before entering idle mode retains/stores information regarding the terminal device context. Thus, when a terminal device reconnects to the network, some or all of this context information may be relied on to support subsequent communications without the base station and terminal device needing to re-exchange the information as part of a radio resource connection procedure, thereby reducing the signalling overhead associated with establishing the terminal device context at the base station. It is expected this kind of approach will be introduced in Release 13 of the LTE standards and this aspect of User Place EPS (evolved packet system) Optimisation may sometimes be referred to as "context caching" or "RRC Resume". For convenience, a terminal device which disconnects from a base station while the base station retains (at least some) context information relating to the terminal device in accordance with this approach may be referred to as being in an RRC Suspend mode. That is to say, the terminal device may be considered to be in a mode in which its RRC connection to a base station is suspended, as opposed to being released as with conventional idle mode. In many respects the RRC suspend mode may be considered to correspond to a special case of the RRC idle mode.

In accordance with currently proposed techniques, when a terminal device in the RRC Suspend mode wishes to re-establish a connection to a currently selected base station (i.e. selected in accordance with the terminal device's conventional cell (re)selection procedures), the terminal device transmits signalling corresponding to a RRC Connection Resume Request to the selected base station. Because the terminal device may have undergone a cell reselection while in the RRC suspend mode (e.g. due to mobility), it may seek to resume connection with a base station which is different from the base station to which the terminal device was previously connected (i.e. the base station storing the terminal device context information). That is to say, the base station to which the terminal device is seeking to connect might not itself have a record of the relevant context information for the terminal device. Accordingly, it has been proposed for a terminal device requesting resumption of an RRC connection to provide an indication of the base station storing its context information (i.e. the base station to which the terminal device was connected before its RRC connection was suspended). In particular, it has been proposed that a terminal device seeking to re-establish connection to the network via a selected base station should convey an indication of what is referred to as a Resume ID. The Resume ID includes an indication of both the identity for the terminal device and the identity of the base station storing the terminal device's context information.

Thus, a base station receiving a RRC resume request from a terminal device can establish where the context information for the terminal device is being stored within the network (e.g. at which base station, or potentially at an element in the core network) and retrieve the context information from the relevant base station, for example through inter-base-station signalling exchange (either directly or through the core network). This may be done in accordance with conventional techniques for exchanging information between base stations in wireless telecommunications systems.

However, there has been some discussion in the technical field about the most appropriate format for the Resume ID, and in particular its size. A short Resume ID as compared to a long resume ID has the advantage of reduced signalling overhead, but at the cost potentially being unable to properly identify the base station storing the context information. This is because a short Resume ID may not include enough bits to allow every possible base station in a wireless telecommunications system to be uniquely identified.

Some specific alternatives that have been proposed for the Resume ID are:
(1) 40 bits consisting of a base station ID and a terminal device ID (e.g. 20 bits each)
(2) 25 bits consisting of a 16 bit C-RNTI and a 9 bit PCI (physical cell identity)
(3) 25 bits consisting of a specific UE Resume of 16 bits and PCI of 9 bits.
(4) 40 bits consisting of a specific UE Resume of 16 bits and a base station ID of 24 bits As another example, an alternative Resume ID might comprise 40 bits made up of a specific UE Resume identifier of 16 bits, a base station ID of 20 bits, and a group ID indicating a group of base station of 4 bits.

In terms of message sizes, a Resume ID of 40 bits may be expected to use an 80 bit message size comprising: the Resume ID (40 bits); establishment cause (3 bits); short MAC-I (16 bits); DVI (4 bits); MAC overhead (8 bits); RRC overhead (4 bits) and spare (5 bits). A Resume ID of 25 bits, on the other hand, may be expected to use a 64 bit message size comprising: the Resume ID (25 bits); establishment cause (3 bits); short MAC-I (16 bits); DVI (4 bits); MAC overhead (8 bits); RRC overhead (4 bits) and spare (3 bits).

Alternatives (2) and (3) (Resume ID=25 bits) have the advantage of a relatively lower signalling overhead, but while a 9 bit PCI can identify a base station from among a group of base stations in one area/neighbourhood, it is typically not sufficient to uniquely identify any base station in a network because of PCI reuse in different areas. Accordingly, the short Resume ID approach may cause difficulties if an RRC Suspended terminal device moves between two different areas which are reusing the same PCIs.

In view of these issues, the inventors have conceived of a new approach in which the format for a Resume ID associated with a request to resume a suspended RRC connection is different depending on the information that needs to be conveyed to a base station to allow the base station to retrieve relevant context information for the terminal device. In particular, a format for an uplink message associated with a request to resume a suspended RRC connection (e.g. a message conveying a Resume ID) may include a different amount of information relating to the identity of a base station storing context information for the terminal device (i.e. a base station to which the terminal device was previously connected) depending on whether or not the base station to which the subsequent request to re-establish a suspended RRC connection is made is the same (or in the same group), as the previous base station storing the terminal device context information, or is a different base station (or in a different group of base stations).

Figure 2:
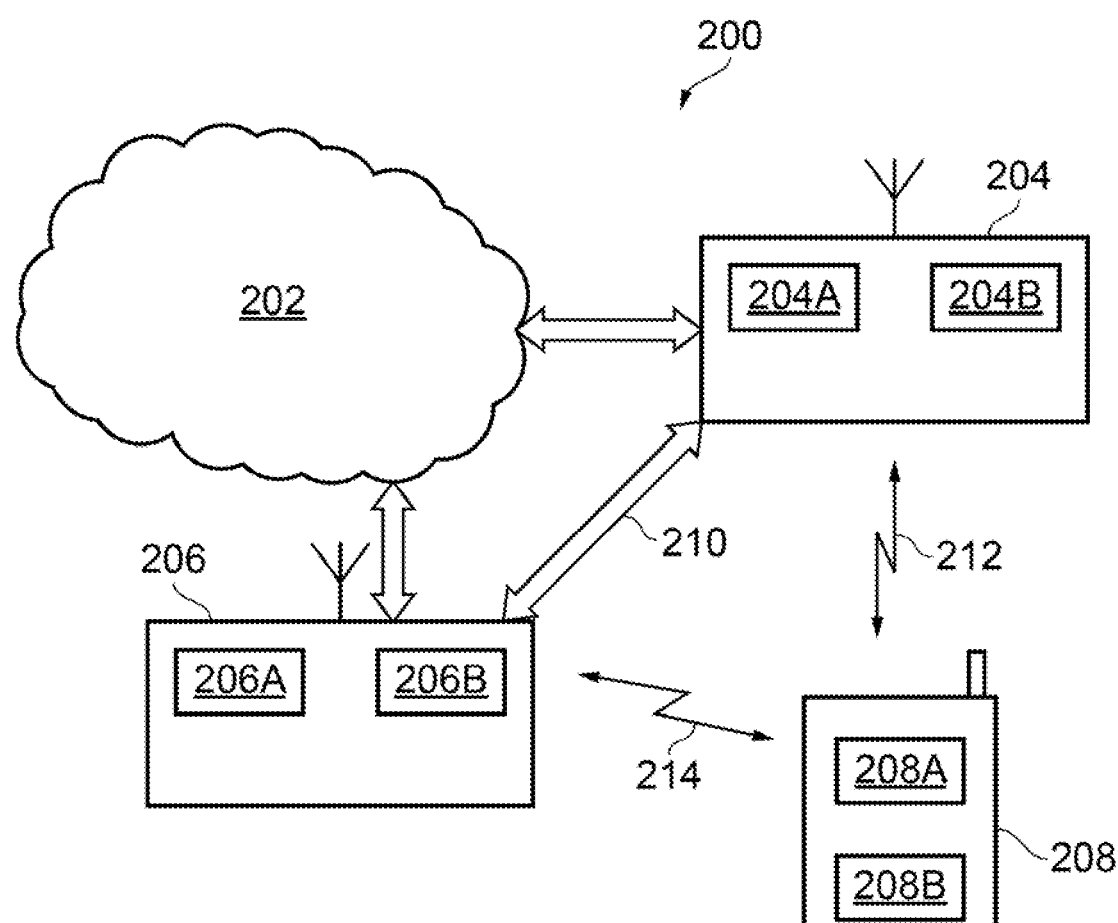
FIG. 2 schematically represents some aspects of a wireless telecommunications network configured to operate in accordance with certain embodiments of the present disclosure.

FIG. 2 schematically shows a telecommunications system 200 according to an embodiment of the present disclosure. The telecommunications system 200 in this example is based broadly around an LTE-type architecture. As such many aspects of the operation of the telecommunications system 200 are known and understood and are not described here in detail in the interest of brevity. Operational aspects of the telecommunications system 200 which are not specifically described herein may be implemented in accordance with any known techniques, for example according to the current LTE-standards.

The telecommunications system 200 comprises a core network part (evolved packet core) 202 coupled to a radio network part. The radio network part comprises a first base station (evolved-nodeB) 204, a second base station (evolved-nodeB) 206 and a terminal device 208. In this example, two base station 204, 206 and one terminal device are shown for simplicity, but it will of course be appreciated that in practice the radio network part may comprise a larger number of base stations serving a larger number of terminal devices across various communication cells.

As with a conventional mobile radio network, the terminal device 208 is arranged to communicate data to and from the base stations (transceiver stations) 204, 206. Typically the terminal device will only be connected to (i.e. able to exchange user plane data with) one base station at a time, although it is also possible for a terminal device to receive certain types of data from multiple base stations simultaneously. The base stations are in turn communicatively connected to a serving gateway, S-GW, (not shown) in the core network part which is arranged to perform routing and management of mobile communications services to the terminal devices in the telecommunications system 200 via the base stations 204, 206. In order to maintain mobility management and connectivity, the core network part 202 also includes a mobility management entity (not shown) which manages the enhanced packet service, EPS, connections with the terminal device 208 operating in the communications system based on subscriber information stored in a home subscriber server, HSS. Other network components in the core network (also not shown for simplicity) include a policy charging and resource function, PCRF, and a packet data network gateway, PDN-GW, which provides a connection from the core network part 202 to an external packet data network, for example the Internet. As noted above, the operation of the various elements of the communications system 200 shown in FIG. 2 may be broadly conventional apart from where modified to provide functionality in accordance with embodiments of the present disclosure as discussed herein.

In this example, it is assumed the terminal device 208 is a machine-type communication (MTC) terminal device 208 adapted to support operations in an Internet of Things (IoT) context in accordance with embodiments of the present disclosure when communicating with the base stations 204, 206. In this regard, the terminal device 208 may be a reduced capability terminal device, for example a terminal device able to operate on a restricted bandwidth as compared to conventional terminal devices (i.e. what might be referred to as a narrowband device). However, it will be appreciated this represents merely one specific implementation of approaches in accordance with embodiments of the disclosure, and in other cases, the same principles may be applied in respect of terminal devices which are not reduced capability terminal devices, but may comprise conventional smartphone terminal devices, or indeed any other form of terminal device, that may be operating in a wireless telecommunications system.

The terminal device 208 comprises a transceiver unit 208A for transmission and reception of wireless signals and a processor unit 208B configured to control the terminal device 208. The processor unit 208B may comprise various sub-units for providing functionality in accordance with embodiments of the present disclosure as explained further herein. These sub-units may be implemented as discrete hardware elements or as appropriately configured functions of the processor unit. Thus the processor unit 208B may comprise a processor unit which is suitably configured/ programmed to provide the desired functionality described herein using conventional programming/configuration techniques for equipment in wireless telecommunications systems. The transceiver unit 208A and the processor unit 208B are schematically shown in FIG. 2 as separate elements for ease of representation. However, it will be appreciated that the functionality of these units can be provided in various different ways, for example using a single suitably programmed general purpose computer, or suitably configured application-specific integrated circuit(s)/circuitry. It will be appreciated the terminal device 208 will in general comprise various other elements associated with its operating functionality, for example a power source, user interface, and so forth, but these are not shown in FIG. 2 in the interests of simplicity.

The first and second base stations 204, 206 in this example are functionally identical but serve different geographical areas (cells). The terminal device 208 may move between these different geographical areas and determine which is the most appropriate base station to connects to in accordance with conventional cell (re)selection procedures. Each base stations 204, 206 comprises a transceiver unit 204A, 206A for transmission and reception of wireless signals and a processor unit 2048, 206B configured to control the base station 204, 206 to operate in accordance with embodiments of the present disclosure as described herein. The respective processor units 204B, 206B may again comprise various sub-units for providing functionality in accordance with embodiments of the present disclosure as explained herein. These sub-units may be implemented as discrete hardware elements or as appropriately configured functions of the processor unit. Thus, the respective processor units 2048, 206B may comprise a processor unit which is suitably configured/programmed to provide the desired functionality described herein using conventional programming/configuration techniques for equipment in wireless telecommunications systems. The respective transceiver units 204A, 206A and processor units 204B, 206B for each base station 204, 206 are schematically shown in FIG. 2 as separate elements for ease of representation. However, it will be appreciated the functionality of these units can be provided in various different ways, for example using a single suitably programmed general purpose computer, or suitably configured application-specific integrated circuit(s)/ circuitry. It will be appreciated the base stations 204, 206 will in general comprise various other elements, for example a power supply, associated with their operating functionality.

Thus, the base stations 204, 206 are configured to communicate data with the terminal device 208 over respective communication links 212, 214. Furthermore, the respective base stations 204, 206 are also able to communicate with one another over communication link 210. In principle this could be based on direct base station-to-base station communications, or based on a communications route through the core network. For example, in an LTE context, the communication link 210 between the two base stations may correspond with an X2 interface.

In one example implementations, the terminal device 208 may establish a radio resource control, RRC, connection with the first base station 204, for example to exchange user plane data with the network. The terminal device may after a period of inactivity be configured to switch to an RRC suspend mode in accordance with proposed techniques. Thus, a dedicated logical channel supporting the RRC connection between the terminal device 208 and the first base station 204 may be released, but, the base station may nonetheless store context information leading to the terminal device 208. Furthermore, the terminal device 208 may store a record of the identity of the first base station to which it was previously connected, and hence which is maintaining context information relating to the terminal device terminate while it is in the RRC suspend mode. Whilst in the RRC suspend mode, the terminal device may perform its conventional cell (re)selection procedures to determine which of the first and second base stations is the most appropriate base station to connect to. For example, this will typically be based on the power and quality of reference signals received from the two base stations (and indeed any other base stations operating in the wireless telecommunications system to which the terminal device 208 may connect).

When the terminal device subsequently needs to exit the RRC suspend mode, for example in response to a paging request or a need to transmit uplink information, it may transmit an RRC resume request to whichever base station is currently selected in accordance with its cell reselection procedures. In accordance with one embodiment of the disclosure, if the terminal device determines the currently selected base station is the one to which it was previously connected, and hence which has context information stored for the terminal device, the terminal device may simply provide the base station with an indication of its own identity. However, if the terminal device determines the currently selected base station is not the one to which it was previously connected, and hence the currently selected base station does not have a record of context information relating to the terminal device, the terminal device may, in association with the RRC resume request, provide the base station with an indication of its own identity and an indication of the base station storing its context information. The base station receiving such a request, may thus determine from the presence of the indication of an identifier for another base station that the other base station is maintaining context information for the terminal device. The base station receiving the RRC request may thus retrieve the context information from the other base station and use this to support subsequent communications with the terminal device without needing to establish a new terminal device context.

Figure 3:
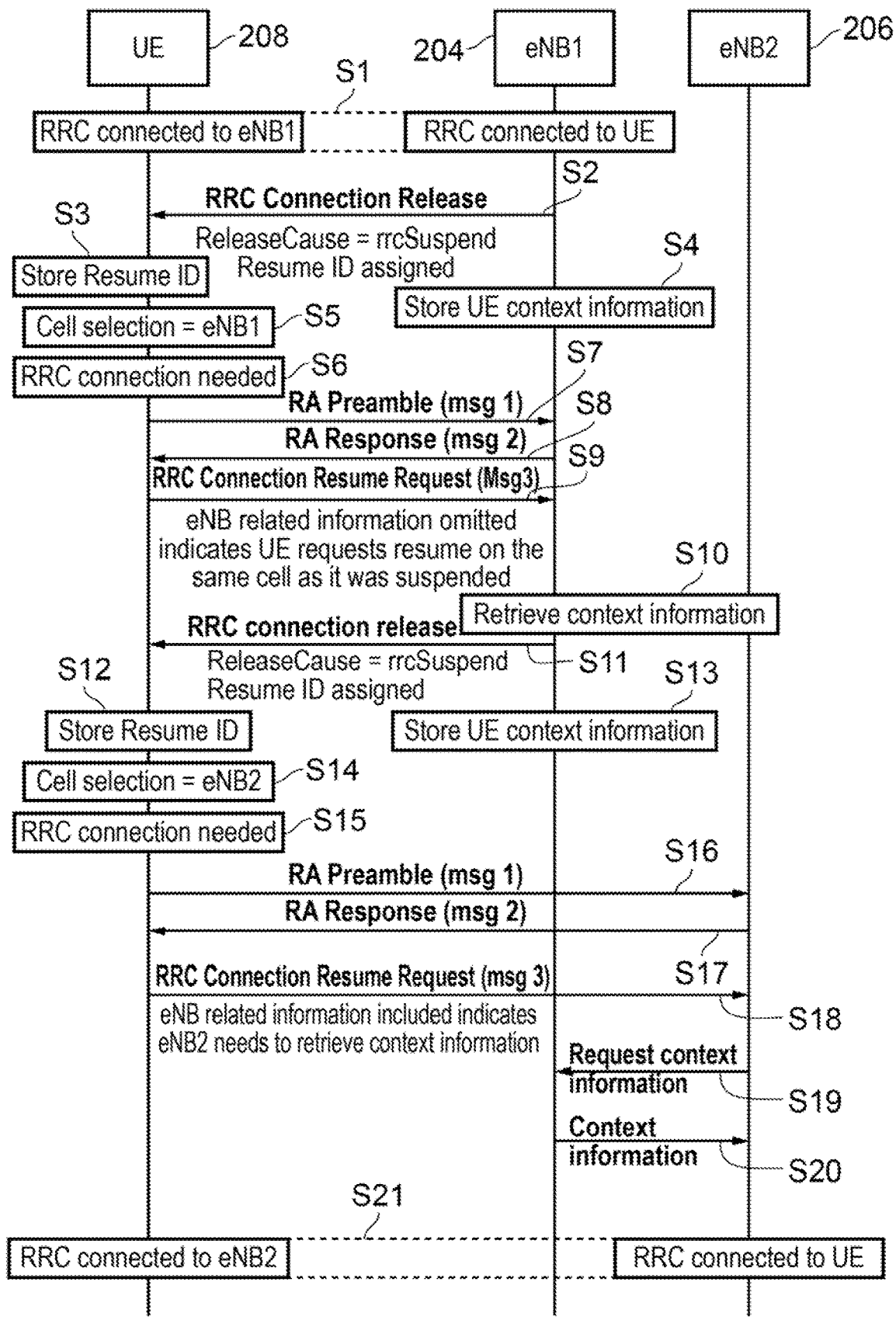
FIG. 3 is a ladder signalling diagram schematically representing some operating aspects of terminal devices and base stations in accordance with certain embodiments of the present disclosure.

FIG. 3 is a ladder diagram schematically representing some aspects of signalling exchange between the terminal device 208 and the base stations (eNBs) 204, 206 of FIG. 2 in accordance with certain embodiments of the disclosure. In FIG. 3 the terminal device 208 is labelled UE, the first base station 204 is labelled eNB1 and the second base station is labelled eNB2.

In step S1 of the signalling represented in FIG. 3 it is assumed the terminal device is RRC connected to the first base station 204 (i.e. in an RRC connected mode with respect to the first base station) and exchanging user plane data with the base station in accordance with conventional techniques. It will of course be appreciated the specific reason for exchanging data between the terminal device and the network, and the contents of the data, is not significant to the principles described herein.

In step S2 the base station to which the terminal device is connected (i.e. the first base station in this example) determines that the RRC connection should be suspended. This may be, for example, because of a period of inactivity in communications between the first base station and the terminal device. However, the reasons for determining the RRC connection should be suspended is not significant to the principles described herein. The first base station transmits an RRC Connection Release message to the terminal device. The RRC Connection Release message is associated with an indication that the release cause is an instruction for the terminal device to transition to RRC suspend mode and also an indication of a Resume ID to be used when the terminal device next connects to the network. This may, for example, be an indication of a terminal device specific identifier, for example based on a current C-RNTI for the terminal device, or a newly-generated identifier. In accordance with proposed techniques for adopting RRC suspend approaches, the Resume ID is also associated with an identifier for the base station to which the terminal device was connected. In some examples an indication of the identity of the base station (i.e. in this case the first base station) may be provided by the base station to the terminal device in association with the RRC connection release message, i.e. the Resume ID received from the base station may already include an indication of the identity of the base station. In other examples it may already be expected the terminal device is aware of an identifier for the base station from which it disconnected, and it may simply use this to form the Resume ID without the base station needing to expressly communicate this information in association with the RRC connection released message. It will also be appreciated that if the UE identifier associated with the resume ID is already known to the terminal device, for example because in a given implementation it corresponds with an existing C-RNTI for the terminal device, there is again no need for this information to be explicitly conveyed from the base station to the terminal device in association with the RRC connection release message.

In response to receiving the RRC connection release message in step S2 the terminal device transitions to RRC suspend mode In step S3 the terminal device stores the Resume ID, that is to say, the terminal device stores the identification information that the first base station has indicated should be used for identifying the terminal device in a subsequent request to connect to the network and also the identification information that identifies the base station itself.

In step S4 the base station stores terminal device context information relating to the terminal device, e.g. configuration settings used for supporting the RRC connection of step S1. What this step reflects is not necessary that a new record is made for the terminal device context, rather an existing record is not deleted but is retained.

While the terminal device remains in RRC suspend mode it continues to perform its cell (re)selection procedures, for example in accordance with conventional techniques. As schematically indicated in step S5 in FIG. 3, it is assumed in this example that during this time the terminal device does not reselect any other cells and the first base station remains the currently selected cell. This may be the case, for example, because the terminal device is currently static.

In step S6 the terminal device determines that it needs to re-establish an RRC connection with the network. The reason why the terminal device needs to do this is not significant and it may be triggered in accordance with conventional techniques. For example, the need to establish an RRC connection may arise because the terminal device has new uplink data to transmit to the network, because the terminal device needs to perform a tracking area update procedure (e.g. a periodic update or because of it has moved to a new tracking area), or because the terminal device has received a paging request from the network.

In step S7 the terminal device transmits a random access preamble (often referred to as message 1 in the random access procedure) to the base station which is currently selected in accordance with its cell reselection procedures (i.e. the base station selected in step S5), which in this case is the first base station 204. This step may in some implementations be performed in accordance with conventional random access techniques.

In step S8, on receiving the random access preamble (message 1) in step S7, the first base station 204 transmits a random access response (commonly referred to as message 2 in the random access procedure) back to the terminal device. The RA Response message comprises, among other things, a grant of uplink radio resources for the terminal device to use for transmitting the next message (commonly referred to as message 3) in the RRC connection request procedure.

In step S9, the terminal device 208 transmits an RRC Connection Resume Request message (i.e. message 3) on the uplink radio resources allocated in the RA response message in step S8. The RRC Connection Resume Request message conveys an indication of information derived from the Resume ID which allows the base station receiving the RRC Connection Resume Request message in step S9 to retrieve context information for the terminal device stored in the network, in this case at the first base station in step S4. Significantly, and in accordance with certain embodiments of the present disclosure, the inventors have recognised the format, and in particular the nature of the content, for the information derived from the resume ID which is conveyed to the network in association with the RRC Connection Resume Request message (message 3) may be different depending on the identity of the base station to which the terminal device is seeking to establish a connection as compared to the identity of the base station to which the terminal device was previously connected (where the terminal device context information is stored). Thus, in the example of FIG. 3 in step S9, the RRC Connection Resume Request message is directed to the same base station as is storing the UE context information (i.e. the cell reselection procedure step S5 has not caused the terminal device to seek to connect to a base station which is different from the base station to which it was previously connected in step S1, and whose identity is associated with the resume ID stored at the terminal device in step S3). Accordingly, in this scenario the terminal device is configured to recognise that it need not convey information relating to the identity of the base station to which it was previously connected (and hence where its previous RRC connection context information is stored) to the base station to which it is seeking to connect, because they are the same base station. Accordingly, the terminal device need only convey information derived from the resume ID which is relevant to the identity of the terminal device (e.g. the information provided by the base station in association with the RRC connection release message in step S2, or information otherwise available to the terminal device, such as its previously used C-RNTI).

On receiving the RRC connection resume request message in Step S9, the first base station 204 recognises from the absence of information identifying any base station that the request must have come from a terminal device that was previously connected to itself, and it should be storing relevant context information for the terminal device. The base station uses the identification information received from the terminal device in association with the RRC connection resume request message to identify the correct context information stored in step S4, and retrieves this, as indicated in step S10. At this stage the terminal device 208 and first base station 206 are able to resume their RRC connection to allow user plane data to be exchanged between them (not shown in FIG. 3).

Thus, the terminal device and base station are able to establish an RRC connection for the exchange of user plane data without having to have exchanged all the information that would normally be required to establish a context for the terminal device and the base station.

In step S11 the base station to which the terminal device is connected (i.e. the first base station) again determines that the current RRC connection should be suspended, e.g. because of a period of inactivity. This step is similar to, and will be understood from, step S2 discussed above. Thus the first base station again transmits an RRC Connection Release message to the terminal device with an indication of a Resume ID to be used when the terminal device next connects to the network.

In response to receiving the RRC connection release message in step S11 the terminal device transitions to RRC suspend mode In step S12 the terminal device stores the Resume ID. This step is similar to, and will be understood from, the above description of step S3.

In step S13 the base station stores terminal device context information relating to the terminal device, e.g. configuration settings used for supporting the most recent RRC connection. This step is similar to, and will be understood from, the above description of step S4.

As discussed above, while the terminal device remains in RRC suspend mode (which may be considered a type of RRC idle mode), it continues to perform its cell (re)selection procedures, for example in accordance with conventional techniques. As schematically indicated in step S14 in FIG. 3, it is assumed in this example that during this time the terminal device determines that the second base station (eNB2) 206, has become the most appropriate base station to which the terminal device should connect. This may be the case, for example, because the terminal device is mobile and has moved closer to the second base station, or because of changes in signal propagation paths meaning the second base station is able to support a better radio link. Again, this cell selection/reselection procedure may be performed in accordance with conventional techniques, for example based on reference signalling received from the respective base stations and other considerations, such as any access barring restrictions and so forth.

In step S15 the terminal device determines that it needs to re-establish an RRC connection with the network. This step is similar to, and will be understood from, the above description of step S6. Again, the specific reason why the terminal device needs to establish an RRC connection to the network is not significant.

In step S16 the terminal device transmits a random access preamble (message 1 in the random access procedure) to the base station which is currently selected in accordance with its cell reselection procedures (i.e. base station selected in step S14), which in this case is the second base station 206 following a reselection in step S14. This step may be performed in accordance with conventional random access techniques.

In step S17, on receiving the random access preamble (message 1) in step S16, the second base station 206 transmits a random access response (message 2 in the random access procedure) back to the terminal device. This step is similar to, and will be understood from, the above description of step S8, and may again be performed in accordance with conventional random access procedures in wireless telecommunications systems.

In step S18, the terminal device 208 transmits an RRC Connection Resume Request message (random access message 3) on the uplink radio resources allocated in the RA response message in step S17. This step corresponds with, and will be understood from, the above description of step S9. However, in this particular scenario one difference is that in step S9 the terminal device was seeking to establish an RRC connection to the same base stations to which it had been connected in an immediately preceding RRC connection, whereas in step S18 the terminal device 208 is seeking to connects to the second base station, whereas it was previously connected to the first base station, as a result of the cell reselection procedure in step S14.

Consequently, the terminal device is aware the base station to which it is requesting to connect does not have local access to context information relating to the terminal device's previous RRC connection. Therefore, the terminal device recognises that it should communicate an indication of the base station storing its context information in association with the RRC resume request message. That is to say, and as noted above, in accordance with certain embodiments of the present disclosure, the format of the RRC connection request message in respect of the information derived from the resume ID which is conveyed to the network in association with the RRC Connection Resume Request message (message 3) is different depending on the identity of the base station to which the terminal device is seeking to establish a connection as compared to the identity of the base station to which the terminal device was previously connected.

Thus, in the example of FIG. 3 in step S18, the RRC Connection Resume Request message is not directed to the same base station as is storing the UE context information (i.e. the cell reselection procedure step S14 has caused the terminal device to seek to connect to a base station which is different from the base station to which it was previously connected.

Accordingly, in this scenario the terminal device is configured to recognise that it needs to convey information relating to the identity of the base station to which it was previously connected (and hence where its previous RRC connection context information is stored) to the base station to which it is seeking to connect. In effect, this is to allow the second base station to know where to find the context information within the network. Accordingly, and in association with the RRC connection resume request message in step S18, the terminal device conveys to the second base station information derived from the resume ID which is relevant to the identity of the terminal device (e.g. the information provided by the first base station in association with the RRC connection release message in step S11) as well as information relating to the identity of the first base station. Depending on implementation, this information may comprise, for example, a physical cell identity (PCI) for the cell, or a more unique identifier for the base station.

On receiving the RRC connection resume request message in Step S18, the second base station 206 recognises from the information identifying the first base station that the request has come from a terminal device that was previously connected to the first base station. The second base station also obtains information identifying the terminal device received from the terminal device in association with the RRC connection resume request in step S18.

Thus, in step S19 the second base station sends a request for context information relating to the terminal device to the first base station. In association with this request, the second base station provides the first base station with an indication of the identity of the terminal device for which the context information is requested based on the information received from the terminal device in association with the RRC connection resume request in step S18. The signalling exchange between the base stations may be made in accordance with conventional techniques for data exchange at the base station level in wireless telecommunications systems, for example using the X2 interface in an LTE context.

On receiving the request from the second base station in step S19, the first base station uses the identification information relating to the terminal device received from the second base station to identify the correct context information stored at the first base station in step S13, and retrieves this information and transmits it back to the second base station, as indicated in step S20.

At this stage second base station has obtained context information relating to the previous RRC connection for the terminal device, and this may be used to support an RRC connection to allow user plane data to be exchanged between them, i.e. to allow the terminal device to transition to a functioning RRC connected mode with respect to the second base station, as schematically represented in step S21.

Thus, in accordance with the principles described above, an RRC connection may be suspended and resumed to reduce the signalling overhead. Furthermore, the format of an RRC connection resume request from a terminal device may be different depending on the identity of the base station (or group of base stations) to which the terminal device is seeking to connect.

Put simply, in accordance with certain embodiments of the disclosure, a terminal device may select what information to transmit in association with a RRC connection resume request (e.g. what information to include in and/or an appropriate format for a Resume ID transmitted in association with the RRC resume request) based on whether it has performed cell reselection to another cell or area (and hence whether the network, and in particular the base station to which it is seeking to resume its RRC connection, requires the additional information to identify at what base station the stored terminal device context resides).

It will be appreciated the term Resume ID may be used herein for simplicity to reflect the information conveyed to the network in association with an RRC resume request to provide information relating to the terminal device identity and the base station storing the terminal device context information. In particular the term Resume ID is used herein regardless of whether in any particular implementations the information comprising the Resume ID is sent as a single information element comprising bits of information relating to both the terminal device identity and the terminal device context-storing base station which are to be separated at the network, or whether the resume ID comprises separate information elements for the terminal device and base station identifiers, and regardless of whether information is sent in one or two (or indeed more) separate messages.

Thus, to summarise some of the basic principles described herein, in accordance with certain embodiments of the disclosure, a terminal device stores cell information (e.g. a base station identifier such as a physical cell identifier, PCI, or cell ID) in respect of which a radio connection is suspended as well as an appropriate identifier for the terminal device (e.g. its C-RNTI, or other network allocated identifier, or an identifier permanently associated with the terminal device or its SIM, such as an IMSI related identifier). This may be stored when initially entering RRC suspend mode, or in response to cell reselection during RRC suspend mode. When an RRC connection is resumed, the terminal device checks on the currently selected cell to see if it has changed from the previously selected cell. If the terminal device is on the same cell, then base station related identification information might be completely omitted from the resume request. Thus, a base station receiving a resume request without any identification information for a base station operating in the wireless telecommunications system can determine from this that it is the base station itself which is storing context information for the terminal device, and may retrieve this information to support the RRC connection with the terminal device in accordance with the proposed techniques for RRC suspend/resume procedures.

However, if the terminal device has moved to a new cell, the terminal device may provide the currently selected base station with additional information relating to the identity of the base station to which it was previously connected, and which is retaining its context information. This can allow the currently selected base station to retrieve the context information from the previous base station, for example in accordance with established base station to base station communication techniques.

In accordance with the principles described above in relation to FIG. 3, the terminal device is configured to transmit messages in different formats (e.g. containing different amounts of information) depending on whether it is seeking to resume an RRC connection with the same base station to which it was previously connected, or a different base station. However, it will be appreciated these principles are not restricted to considerations related individual base stations, but can be expanded to different hierarchical levels of base station grouping.

For example, it is common in an LTE type networks for a neighbourhood of base stations to be distinguished from one another by a physical cell identity, PCI. A different geographically separate neighbourhood of base stations operating in the same wireless telecommunications network may similarly be distinguish one other using the same set of PCIs. Thus, in accordance with the general principles described herein, a terminal device exiting RRC suspend mode may determine whether a base station which it has selected to connect to is within the same neighbourhood group as the base station to which it was previously connected, and if so identify the base station by including an indication of the relevant PCI in association with the RRC resume request. However, if the terminal device exiting RRC suspend mode determines the base station it has selected is not within the same neighbourhood group as the base station to which it was previously connected, it may identify the previous base station by including more information, for example a cell ID, to allow the currently selected base station to locate the previously selected/connected base station and retrieve the relevant context information. Thus, a base station receiving a resume request associated with a PCI can use this to identify the previous base station within its neighbourhood group, and a base station receiving a resume request associated with a longer cell ID can use this to identify the previous base station more widely in the network. Similar approaches may be adopted in respect of tracking areas. That is to say, the terminal device may select a format for a request message (i.e. an amount of information to include in the request message) according to whether or not the terminal device has moved to a different tracking area, for example based on a tracking area ID broadcast in system information. Thus, the terminal device may be configured to provide the RRC connection request in a format which contains sufficient information to allow the previously selected base station to be detected, but without needing more information than is necessary. Thus, in accordance with approaches of certain implementations, there is provided a method of operating a terminal device in a wireless telecommunications network comprising the terminal device and a plurality of base stations. The base stations may be considered as being logically arranged into groups of one or more base stations supporting communications over different areas. For example, in some implementations the different groups may each consist of an individual base station, in other implementations the different groups may comprise neighbourhoods of base stations sharing a PCI set, and in other implementations the different groups may comprise base stations in different tracking areas.

The terminal device may select an initial base station to connect to, e.g. after first being turned on or in response to new need for an RRC connection, for example in accordance with conventional RRC cell selection procedures, and subsequently establish a radio resource control, RRC, connection with the initially selected base station to enter an RRC connected mode of operation with respect to the initially selected base station. The initially selected base station may be considered a member of a first group of base stations. The terminal device's RRC connection with the initially selected base station may be subsequently suspended with the terminal device entering an RRC suspended mode of operation. In accordance with proposed techniques for the RRC suspend mode of operation, the terminal device may maintain a record of an appropriate identifier to be used when reconnecting to the network to identify the terminal device and also an identifier to identify the base station which it was most recently connected, and the base station may store context information relating to the RRC connection with the terminal device.

During the RRC suspend mode of operation, the terminal device may perform cell reselection procedures in accordance with conventional techniques. Accordingly, the terminal device may subsequently decide that it should establish an RRC connection to the network with a subsequently selected base station. The message to request a resumed RRC connection may be transmitted with a first format if the subsequently selected base station is a member of the first group of base stations and may be transmitted with a second format, which is different form the first format, if the subsequently selected base station is not a member of the first group of base stations.

In accordance with certain approaches, the second format may include more information for identifying the initially selected base station from among other base stations in the wireless telecommunication system than the first format. Both of the formats may include some information on the identity of the initially selected base station, for example the first format may include a local neighbourhood PCI for the initially selected base station and the second format may include a network wide cell ID. The cell ID comprises more bits than a PCI, but allows the initially selected station to be uniquely identified from among a larger group of base stations. In other cases, the second format may include information identifying the base station to which the terminal device was previously connected, and which is storing context information for the terminal device, for example a PCI or cell ID, and the first format may not include any explicit information bits for providing an identification of the base station. In this case, a base station receiving a message in accordance with the first format may assume it itself is the base station storing the context information.

The different formats of request message may comprise different formats in the sense of having different types of content, for example comprising different amounts of information relating to the identity of a base station to which the terminal device was previously selected. In other implementations, the different formats may be more fundamentally different. For example, the second format may correspond with a request message comprising two separate sub messages/message components, with a first of these corresponding in format to the first format, but with a second of these providing additional identification information in accordance with the principles described herein. The first message component of the second format may convey an indication to the network that a subsequent second message component is to be sent. This indication may, for example, correspond with a an explicit indicate a bit (e.g. a bit is included in a MAC header) that is set to a value depending on whether a subsequent second message component is to be sent (indicating the request is of the second format) or whether a subsequent second message is not to be sent (indicating the request is of the first format). In another example the indication may be provided by appropriately selecting a predefined coding scheme for the first message component to indicate a second message component to be sent, or using a predefined scrambling sequence for the first message, or a cyclic redundancy check masked with a predefined sequence of bits, or by using a predefined interleaving pattern for the first message component, or switching the I and Q axes of modulation symbols in the first message component to provide an indication there will be a subsequent message component providing additional information in respect of the identity of a base station at which context information for the terminal device is stored.

In some implementations the transmission of an RRC resume request message may first require an allocation (grant) of uplink radio resources for the terminal device to use for transmitting the request message (e.g. corresponding to steps S8 and S17 in FIG. 3).

In some cases the base station may be configured to allocate a fixed amount of radio resources, even though the message may be received in accordance with a first format or a second format, wherein the second format requires the transmission of more information bits. In this case the terminal device may simply choose an appropriate coding scheme to make most efficient use of the radio resources allocated. For example, a higher degree of redundancy, leading to increased chance of successful transmission, may be used in respect of a shorter first format message as compared to a longer second format message.

In other approaches, the base station may in a step corresponding to steps S8 and S17 in FIG. 3, be configured to allocate a maximum set of physical resources and maximum transport block size that the terminal can use for transmitting a subsequent request message. The terminal device may then determine which physical resources and transport block size to use. Thus, for the second format (format containing more identification information) the terminal device may use of all PRBs within the maximum set of physical resources and TBS1 (e.g. 80 bit TBS and 3PRBs), whereas for the second format, the terminal device may use a subset of the maximum set of physical resources and TBS2 (e.g. 64 bit TBS and 2PRBs)

In another approach, the base station may in a step corresponding to steps S8 and S17 in FIG. 3, be configured to assign a set of physical resources and a maximum transport block size that the terminal device can use. The terminal device may then either be assigned, or derive, an appropriate power level at which to transmit that maximum transport block size within the allocated physical resources. If the terminal device transmits the maximum transport block size (e.g. 80 bits for the longer second format message), it uses this power level. However for transmitting a shorter first format message (e.g. 64 bits), it may use a lower power level. The lower power level may, for example, correspond with a fixed or signalled power offset relative to the power to be applied for second format messages. Alternatively, the lower power level may be determined by the terminal device (for example the terminal device may determine that a 64 bit transport block can be transmitted at 64/80=80% of the power of an 80 bit transport block), and said it is transmission power accordingly, thereby saving power for the terminal device.

In another example, a terminal device may be in a coverage limited region (i.e. a region with a high radio path loss). In this case the terminal device may be required to transmit numerous repetitions of transport blocks. Accordingly, a terminal device may transmit a lower number of repetitions of the transport block when a smaller transport block is transmitted (e.g. for a first format message), as compared to when a larger transport block is transmitted (e.g. for a second format message). Again, this method reduces the total amount of energy that is transmitted by the terminal device.

In each of these examples, the terminal device may be configured to select which transmission scheme to apply on the basis of which type of message to transmit (e.g. first format or second format depending on what information relating to the identification of the base station in the wireless telecommunications network to which the terminal device was previously connected needs to be transmitted). Thus, the terminal device may select the relevant transmission format, and the base station may be configured to simply blind decode between the two (or more) possibilities. Alternatively, the terminal device may be configured to scramble the message differently, interleave the message differently, and/or mask the cyclic redundancy check, CRC, with a different bit field depending on the message format being used to assist the base station's blind decoding. In yet another example, the terminal device may provide the base station with an explicit indication, for example within a field piggybacked on the transmission, to indicate which format has been adopted, the base station can thus decode the indication and determine how to decode the rest of the message.

In another embodiment, the base station may assign two or more sets of physical resources and TBS to the terminal device (e.g. using compressed signalling by indicating one set of resources as an offset from another set). The terminal device then uses the set of resources that are associated with the type of message (long/short/shorter) that it wishes to transmit. The base station then simply receives one message from the terminal device on the relevant resources.

In some approaches the base station may be configured to allocate different amounts of radio resources depending on whether the terminal device is going to transmit a first format message or a second format message. To facilitate this, terminal device may be configured to convey to the subsequently selected base station an indication of whether the message to request a resumed RRC connection it is intending to transmit will be transmitted using the first format or the second format in advance of transmitting the message. This can be achieved, for example, by selecting a random access preamble to be used in association with a request for a grant of uplink radio resources for the RRC resume request message from a first pre-defined group of random access preambles to be used for indicating a first (short) format message or from a second predefined group of random access preambles to be used for indicating a second (long) format message. The base station may then allocate an appropriate amount of resource based on which preamble is used in association with the request for the resources (i.e. in association with the messages transmitted in steps S7 and S16 of FIG. 3).

Thus there has been described method of operating a terminal device in a wireless telecommunications network comprising the terminal device and a plurality of base stations, wherein the base stations are arranged into groups of one or more base stations supporting communications over different areas, wherein the method comprises: establishing a radio resource control, RRC, connection with an initially selected base station and entering an RRC connected mode of operation with respect to the initially selected base station, wherein the initially selected base station is a member of a first group of base stations; suspending the RRC connection with the initially selected base station and entering an RRC suspended mode of operation; and subsequently transmitting a message to request a resumed RRC connection to a subsequently selected base station, wherein the subsequently selected base station is selected in accordance with a cell selection procedure for the terminal device performed while in the RRC suspended mode of operation, and wherein the message to request a resumed RRC connection is transmitted with a first format if the subsequently selected base station is a member of the first group of base stations and is transmitted with a second format, which is different form the first format, if the subsequently selected base station is not a member of the first group of base stations.

Put another way, there has been described a method of operating a terminal device in a wireless telecommunications network comprising the terminal device and a plurality of base stations supporting communications within the wireless telecommunications network, wherein communications within a first area are supported by a first group of base stations comprising one or more of the plurality of base stations and communications within a second area are supported by a second group of base stations comprising one or more of the plurality of base stations, wherein the method comprises: establishing a radio resource control, RRC, connection with an initially selected base station in the first group of base stations and entering an RRC connected mode of operation with respect to the initially selected base station; suspending the RRC connection with the initially selected base station and entering an RRC suspended mode of operation; and subsequently transmitting a message to request an RRC connection to a subsequently selected base station, wherein the subsequently selected base station is selected in accordance with a cell selection procedure for the terminal device, and wherein a format for the message is selected according to whether or not the subsequently selected base station is in the first group of base stations or in the second group of base stations.

There has also been described a method of operating a base station in a wireless telecommunications network comprising a terminal device and a plurality of base stations supporting communications within the wireless telecommunications network, wherein communications within a first area are supported by a first group of base stations comprising one or more of the plurality of base stations including the first base station and communications within a second area are supported by a second group of base stations comprising one or more of the plurality of base stations, wherein the method comprises: receiving from the terminal device a message to request an RRC connection to the base station, wherein the message is associated with an indication of an identity of a base station in the wireless telecommunications system at which context information relating to a previous RRC connection for the terminal device is stored, and wherein a format for the message depends on whether or not the base station in the wireless telecommunications system at which context information relating to a conflict previous RRC connection for the terminal device is stored is in the first group of base stations or in the second group of base stations.

It will be appreciated that the principles described herein are not applicable only to certain types of terminal device, but can be applied more generally in respect of any types of terminal device, for example the approaches are not limited to machine type communication devices/IoT devices or other narrowband terminal devices, but can be applied more generally, for example in respect of any type terminal device operating in a wireless to the communication network.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of operating a terminal device in a wireless telecommunications network comprising the terminal device and a plurality of base stations, wherein the base stations are arranged into groups of one or more base stations supporting communications over different areas, wherein the method comprises: establishing a radio resource control, RRC, connection with an initially selected base station and entering an RRC connected mode of operation with respect to the initially selected base station, wherein the initially selected base station is a member of a first group of base stations; suspending the RRC connection with the initially selected base station and entering an RRC suspended mode of operation; and subsequently transmitting a message to request a resumed RRC connection to a subsequently selected base station, wherein the subsequently selected base station is selected in accordance with a cell selection or reselection procedure for the terminal device performed while in the RRC suspended mode of operation, and wherein the message to request a resumed RRC connection is transmitted with a first format if the subsequently selected base station is a member of the first group of base stations and is transmitted with a second format, which is different form the first format, if the subsequently selected base station is not a member of the first group of base stations.

Paragraph 2. The method of paragraph 1, wherein the second format includes more information for identifying the initially selected base station from among other base stations in the wireless telecommunication system than the first format.

Paragraph 3. The method of paragraph 2, wherein the second format includes information bits identifying the initially selected base station and first format does not include information bits identifying the initially selected base station.

Paragraph 4. The method of paragraph 2, wherein first format includes information to allow the subsequently selected base station to identify the initially selected base station from among other base stations in the first group of base stations and the second format includes more information to allow the subsequently selected base station to identify the initially selected base station from among a greater number of other base stations than are in the first group of base stations.

Paragraph 5. The method of any of paragraphs 1 to 4, wherein the second format differs from the first format by including a physical cell identity, PCI, associated with the initially selected base station.

Paragraph 6. The method of any of paragraphs 1 to 5, wherein the second format differs from the first format by including a cell identification, Cell ID, associated with the initially selected base station.

Paragraph 7. The method of paragraph 6, wherein the first format includes a physical cell identity, PCI, associated with the initially selected base station.

Paragraph 8. The method of any of paragraphs 1 to 7, wherein the first group of base stations consists of the initially selected base station.

Paragraph 9. The method of any of paragraphs 1 to 8, wherein the first group of base stations comprise a tracking area within the wireless telecommunications network.

Paragraph 10. The method of any of paragraphs 1 to 9, wherein the method further comprises conveying to the subsequently selected base station an indication of whether the message to request a resumed RRC connection is transmitted with the first format or the second format in advance of transmitting the message.

Paragraph 11. The method of paragraph 10, wherein conveying to the subsequently selected base station an indication of whether the message to request a resumed RRC connection is transmitted with the first format or the second format comprises conveying to the subsequently selected base station an uplink grant request for an allocation of uplink radio resources for transmitting the message to request a resumed RRC connection, wherein the uplink grant request is associated with a preamble selected for a first group of one or more preambles to indicate the message to request a resumed RRC connection is to be transmitted with the first format or a preamble selected for a second, different, group of one or more preambles to indicate the message to request a resumed RRC connection is to be transmitted with the second format.

Paragraph 12. The method of any of paragraphs 1 to 11, wherein a coding format for the signalling conveying the message to request a resumed RRC connection is selected according to whether the message is transmitted with the first format or the second format.

Paragraph 13. The method of any of paragraphs 1 to 12, wherein the first format and the second format are both associated with the transmission of a first message component, and the second format differs from the first format by further being associated with the subsequent transmission of a second message component providing more information relating to an identity for the initially selected base station, wherein a characteristic selected for the first message provide an indication of whether or not a second message component is to be transmitted.

Paragraph 14. A terminal device for use in a wireless telecommunications network comprising the terminal device and a plurality of base stations, wherein the base stations are arranged into groups of one or more base stations supporting communications over different areas, wherein the terminal device comprises a controller unit and a transceiver unit configured such that the terminal device is operable to: establish a radio resource control, RRC, connection with an initially selected base station and enter an RRC connected mode of operation with respect to the initially selected base station, wherein the initially selected base station is a member of a first group of base stations; suspend the RRC connection with the initially selected base station and enter an RRC suspended mode of operation; and subsequently transmit a message to request a resumed RRC connection to a subsequently selected base station, wherein the subsequently selected base station is selected in accordance with a cell selection procedure or reselection for the terminal device performed while in the RRC suspended mode of operation, and wherein the message to request a resumed RRC connection is transmitted with a first format if the subsequently selected base station is a member of the first group of base stations and is transmitted with a second format, which is different form the first format, if the subsequently selected base station is not a member of the first group of base stations.

Paragraph 15. Integrated circuitry for a terminal device for use in a wireless telecommunications network comprising the terminal device and a plurality of base stations, wherein the base stations are arranged into groups of one or more base stations supporting communications over different areas, wherein the integrated circuitry comprises a controller element and a transceiver element configured to operate together such that the terminal device is operable to: establish a radio resource control, RRC, connection with an initially selected base station and enter an RRC connected mode of operation with respect to the initially selected base station, wherein the initially selected base station is a member of a first group of base stations; suspend the RRC connection with the initially selected base station and enter an RRC suspended mode of operation; and subsequently transmit a message to request a resumed RRC connection to a subsequently selected base station, wherein the subsequently selected base station is selected in accordance with a cell selection or reselection procedure for the terminal device performed while in the RRC suspended mode of operation, and wherein the message to request a resumed RRC connection is transmitted with a first format if the subsequently selected base station is a member of the first group of base stations and is transmitted with a second format, which is different form the first format, if the subsequently selected base station is not a member of the first group of base stations.

Paragraph 16. A method of operating a base station in a wireless telecommunications network comprising the base station, a plurality of other base stations, and a terminal device, wherein the base stations are arranged into groups of one or more base stations supporting communications over different areas, wherein the method comprises: receiving from the terminal device a message to request an RRC connection to the base station, wherein the message conveys an indication of an identity of a base station in the wireless telecommunications network at which context information relating to a previous RRC connection for the terminal device is stored, wherein the base station at which context information is stored is a member of a first group of base stations, and wherein the message to request a resumed RRC connection is received with a first format if the base station is a member of the first group of base stations and is received with a second format, which is different form the first format, if the base station is not a member of the first group of base stations.

Paragraph 17. The method of paragraph 16, further comprising determining the identity of the base station at which context information is stored in a manner that takes account of whether the message is received in the first format or the second format.

Paragraph 18. The method of paragraph 16 or 17, further comprising retrieving the context information from the base station at which context information is stored and establishing an RRC connection with the terminal device using the context information.

Paragraph 19. The method of any of paragraphs 16 to 18, wherein the different formats for the message require different amounts of uplink radio resource to convey the message from the terminal device to the base station, and wherein the method further comprises receiving from the terminal device a request for a grant of uplink radio resources for the terminal device to use to transmit the message to the base station, wherein the request for a grant of uplink radio resources is associated with an indication of whether the terminal device is to send the message in the first format or the second format.

Paragraph 20. A base station for use in a wireless telecommunications network comprising the base station, a plurality of other base stations, and a terminal device, wherein the base stations are arranged into groups of one or more base stations supporting communications over different areas, wherein the base station comprises a controller unit and a transceiver unit configured such that the base station is operable to: receive from the terminal device a message to request an RRC connection to the base station, wherein the message conveys an indication of an identity of a base station in the wireless telecommunications network at which context information relating to a previous RRC connection for the terminal device is stored, wherein the base station at which context information is stored is a member of a first group of base stations, and wherein the message to request a resumed RRC connection is received with a first format if the base station is a member of the first group of base stations and is received with a second format, which is different form the first format, if the base station is not a member of the first group of base stations.

Paragraph 21. Integrated circuitry for a base station for use in a wireless telecommunications network comprising the base station, a plurality of other base stations, and a terminal device, wherein the base stations are arranged into groups of one or more base stations supporting communications over different areas, wherein the integrated circuitry comprises a controller element and a transceiver element configured to operate together such that the base station is operable to: receive from the terminal device a message to request an RRC connection to the base station, wherein the message conveys an indication of an identity of a base station in the wireless telecommunications network at which context information relating to a previous RRC connection for the terminal device is stored, wherein the base station at which context information is stored is a member of a first group of base stations, and wherein the message to request a resumed RRC connection is received with a first format if the base station is a member of the first group of base stations and is received with a second format, which is different form the first format, if the base station is not a member of the first group of base stations.

REFERENCES

[1] ETSI TS 122 368 V12.4.0 (2014 October)/3GPP TS 22.368 version 12.4.0 Release 12

[2] Holma H. and Toskala A, "LTE for UMTS OFDMA and SC-FDMA based radio access", John Wiley and Sons, 2009

What is claimed is:

1. Integrated circuitry for a terminal device for use in a wireless telecommunications network comprising the terminal device and a plurality of base stations, wherein the base stations are arranged into groups of one or more base stations supporting communications over different areas, wherein the integrated circuitry comprises a controller and a transceiver configured to operate together such that the terminal device is operable to:

establish a radio resource control, RRC, connection with an initially selected base station and enter an RRC connected mode of operation with respect to the initially selected base station, wherein the initially selected base station is a member of a first group of base stations;

suspend the RRC connection with the initially selected base station and enter an RRC suspended mode of operation;

subsequently transmit a message to request a resumed RRC connection to a subsequently selected base station, wherein the subsequently selected base station is selected in accordance with a cell selection or reselection procedure for the terminal device performed while in the RRC suspended mode of operation, and recognize that information relating to an identity of the initially selected base station does not need to be conveyed with the message to request a resumed RRC connection in response to the cell selection or reselection procedure causing the terminal device to seek to connect to the initially selected base station, wherein, if the subsequently selected base station is a member of the first group of base stations, the message to request a resumed RRC connection is transmitted with a first format that omits information related to the identity of the initially selected base station, and wherein, if the subsequently selected base station is not a member of the first group of base stations, the message to request a resumed RRC connection is transmitted with a second format, which is different form the first format, wherein the second format includes information bits identifying the initially selected base station and the first format does not include information bits identifying the initially selected base station.

2. The integrated circuitry for the terminal device of claim 1, wherein the second format includes more information for identifying the initially selected base station from among other base stations in the wireless telecommunication system than the first format.

3. The integrated circuitry for the terminal device of claim 2, wherein first format includes information to allow the subsequently selected base station to identify the initially selected base station from among other base stations in the first group of base stations and the second format includes more information to allow the subsequently selected base station to identify the initially selected base station from among a greater number of other base stations than are in the first group of base stations.

4. The integrated circuitry for the terminal device of claim 1, wherein the second format differs from the first format by including a physical cell identity, PCI, associated with the initially selected base station.

5. The integrated circuitry for the terminal device of claim 1, Wherein the second format differs from the first format by including a cell identification, Cell ID, associated with the initially selected base station.

6. The integrated circuitry for the terminal device of claim 5, wherein the first format includes a physical cell identity, PCI, associated with the initially selected base station.

7. The integrated circuitry for the terminal device of claim 1, wherein the first group of base stations consists of the initially selected base station.

8. The integrated circuitry for the terminal device of claim 1, wherein the first group of base stations comprise a tracking area within the wireless telecommunications network.

9. The integrated circuitry for the terminal device of claim 1, wherein the method further comprises conveying to the subsequently selected base station an indication of whether the message to request a resumed RRC connection is transmitted with the first format or the second format in advance of transmitting the message.

10. The integrated circuitry for the terminal device of claim 9, wherein conveying to the subsequently selected base station an indication of whether the message to request a resumed RRC connection is transmitted with the first format or the second format comprises conveying to the subsequently selected base station an uplink grant request for an allocation of uplink radio resources for transmitting the message to request a resumed RRC connection, wherein the uplink grant request is associated with a preamble selected for a first group of one or more preambles to indicate the message to request a resumed RRC connection is to be transmitted with the first format or a preamble selected for a second, different, group of one or more preambles to indicate the message to request a resumed RRC connection is to be transmitted with the second format.

11. The integrated circuitry for the terminal device of claim 1, wherein a coding format for the signaling conveying the message to request a resumed RRC connection is selected according to whether the message is transmitted with the first format or the second format.

12. The integrated circuitry for the terminal device of claim 1, wherein the first format and the second format are both associated with the transmission of a first message component, and the second format differs from the first format by further being associated with the subsequent transmission of a second message component providing more information relating to an identity for the initially selected base station, wherein a characteristic selected for the first message provides an indication of whether or not a second message component is to be transmitted.

13. A base station for use in a wireless telecommunications network comprising the base station, a plurality of other base stations, and a terminal device, wherein the base stations are arranged into groups of one or more base stations supporting communications over different areas, wherein the base station comprises circuitry configured to:
receive from the terminal device a message to request an RRC connection to the base station, wherein the message conveys an indication of an identity of a base station in the wireless telecommunications network at which context information relating to a previous RRC connection for the terminal device is stored, wherein the base station at which context information is stored is a member of a first group of base stations,
wherein the message to request a resumed RRC connection is received with a first format if the base station is a member of the first group of base stations, wherein the first format omits information related to the identity of the base station and the base station recognizes from the absence of information identifying any base station that the message to request the resumed RRC connection is received from the terminal device that was previously connected to the base station, and
wherein the message to request the resumed RRC connection is received with a second format, which is different form the first format, if the base station is not a member of the first group of base stations, wherein the second format includes information bits identifying an initially selected base station and the first format does not include information bits identifying the initially selected base station.

14. The base station of claim 13, wherein the circuitry is further configured to
determine the identity of the base station at which context information is stored in a manner that takes account of whether the message is received in the first format or the second format.

15. The base station of claim 13, wherein the circuitry is further configured to
retrieve the context information from the base station at which context information is stored and establishing an RRC connection with the terminal device using the context information.

16. The base station of claim 13, wherein the different formats for the message require different amounts of uplink radio resource to convey the message from the terminal device to the base station.

17. The base station of claim 16, wherein the circuitry is further configured to wherein the circuitry is further configured to
receive from the terminal device a request for a grant of uplink radio resources for the terminal device to use to transmit the message to the base station, wherein the request for a grant of uplink radio resources is associated with an indication of whether the terminal device is to send the message in the first format or the second format.

18. Integrated circuitry for a base station for use in a wireless telecommunications network comprising the base station, a plurality of other base stations, and a terminal device, wherein the base stations are arranged into groups of one or more base stations supporting communications over different areas, wherein the integrated circuitry comprises a controller and a transceiver configured to operate together such that the base station is operable to:
receive from the terminal device a message to request an RRC connection to the base station, wherein the message conveys an indication of an identity of a base station in the wireless telecommunications network at which context information relating to a previous RRC connection for the terminal device is stored, wherein the base station at which context information is stored is a member of a first group of base stations, and
wherein the message to request a resumed RRC connection is received with a first format if the base station is a member of the first group of base stations, wherein the first format omits information related to the identity of the base station and the base station recognizes from the absence of information identifying any base station that the message to request the resumed RRC connection is received from the terminal device that was previously connected to the base station, and
wherein the message to request the resumed RRC connection is received with a second format, which is different form the first format, if the base station is not a member of the first group of base stations, wherein the second format includes information bits identifying an initially selected base station and the first format does not include information bits identifying the initially selected base station.

19. The integrated circuitry for the base station of claim 18, wherein the base station is further operable to
determine the identity of the base station at which context formation is stored in a manner that takes account of whether the message is received in the first format or the second format.

* * * * *